(12) United States Patent  
Shih et al.

(10) Patent No.: US 11,470,201 B2  
(45) Date of Patent: Oct. 11, 2022

(54) SYSTEMS AND METHODS FOR PROVIDING REAL TIME ASSISTANCE TO VOICE OVER INTERNET PROTOCOL (VOIP) USERS

(71) Applicant: DELL PRODUCTS L.P., Round Rock, TX (US)

(72) Inventors: Chia Hung Shih, Taipei (TW); Chien Yu Huang, New Taipei (TW); Su Hsuan Chu, New Taipei (TW); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 16/943,994

(22) Filed: Jul. 30, 2020

(65) Prior Publication Data

US 2022/0038581 A1 Feb. 3, 2022

(51) Int. Cl.
| | |
|---|---|
| *G10L 15/00* | (2013.01) |
| *G10L 25/90* | (2013.01) |
| *G10L 15/06* | (2013.01) |
| *G10L 21/00* | (2013.01) |
| *H04M 1/253* | (2006.01) |
| *G10L 13/00* | (2006.01) |
| *H04M 7/00* | (2006.01) |
| *H04L 65/1063* | (2022.01) |
| *H04L 65/1069* | (2022.01) |

(52) U.S. Cl.
CPC ...... *H04M 7/0087* (2013.01); *H04L 65/1063* (2013.01); *H04L 65/1069* (2013.01); *H04M 1/2535* (2013.01)

(58) Field of Classification Search
CPC ..... G10L 15/26; G10L 15/22; G10L 21/0272; G10L 13/00; H04M 2201/40; H04M 3/4936; H04M 1/2535; H04M 3/568
USPC .................. 704/270.1, 275, 246; 379/374.02
See application file for complete search history.

(56) References Cited

U.S. PATENT DOCUMENTS

| | | | |
|---|---|---|---|
| 2006/0067266 A1* | 3/2006 | Ehlers ................... | H04W 28/06 370/522 |
| 2007/0002902 A1* | 1/2007 | Hannuksela ..... | H04N 21/43072 375/E7.278 |
| 2010/0046378 A1* | 2/2010 | Knapp ................ | H04L 41/0631 370/242 |
| 2018/0032884 A1* | 2/2018 | Murugeshan ....... | G06F 16/2471 |

(Continued)

OTHER PUBLICATIONS

Wikipedia, "Tuple", Printed from Internet Jul. 15, 2020, 7 pgs.

(Continued)

*Primary Examiner* — Khaled M Kassim  
*Assistant Examiner* — Jason A Harley  
(74) *Attorney, Agent, or Firm* — Egan, Enders & Huston LLP.

(57) ABSTRACT

Systems and methods are provided that may be implemented in a real time manner by an information handling system (the "client system") to monitor one or more characteristics of a voice over internet protocol (VOIP) discussion, to use these monitored VOIP characteristics to identify one or more condition/s in real time as they are identified to occur during the current VOIP discussion, and to determine to take one or more automatic actions based on the identified VOIP condition/s so as to inform and/or alert a current human user of the client system to the occurrence of the identified VOIP condition/s as they occur.

20 Claims, 6 Drawing Sheets

(56) References Cited

U.S. PATENT DOCUMENTS

2020/0135209 A1* 4/2020 Delfarah ................. G10L 15/20
2020/0227034 A1 7/2020 Summa et al.

OTHER PUBLICATIONS

Domars, "Voice Activation-Windows Drivers", Microsoft Docs, May 2020, 19 pgs.

Trevorbye, "Speech-To-Text-Speech Service-Azure Cognitive Services", Microsoft Docs, Mar. 2020, 4 pgs.

Iyer et al., "Alert Generation Based On Distance Between Two Wirelessly Connected Electronic Devices", U.S. Appl. No. 16/738,633, filed Jan. 9, 2020, 38 pgs.

\* cited by examiner

SYSTEMS AND METHODS FOR PROVIDING REAL TIME ASSISTANCE TO VOICE OVER INTERNET PROTOCOL (VOIP) USERS

FIELD

This invention relates generally to information handling systems and, more particularly, to implementing voice over internet protocol (VOIP) on information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Voice over internet protocol (VOIP) is a technique often used by remotely-located meeting participants for collaboration across the Internet. These meeting participants may be located in different offices and/or in different geographical locations. Using this technique, each meeting participant uses an information handling system that is coupled to the Internet to speak to, and listen to, the other collaborating meeting participants.

Large VOIP conferences may involve many meeting participants who address many different topics that are not all be relevant to every meeting participant. In such a case, a given VOIP meeting participant may wish to "multitask" by performing other unrelated tasks during portions of the VOIP conference that do not involve them and that are not relevant for them. However, it may be difficult for a given meeting participant to multitask in this manner while at the same time maintaining sufficient real time focus and concentration on the context of the current VOIP discussion so that they are ready and listening to take notes and answer questions directed to them when the conversation becomes relevant.

As an example, a given information handling system user may be participating in a large group VOIP conference having 100 other participants and lasting for one hour. During the course of the VOIP conference, a question may be occasionally and randomly directed to the given user, which necessitates the given user's attention to be directed to the discussion for thirty seconds or so in order to answer the question. Thus, the given user does not need to be fully attentive all the time, yet they need to be attentive to the discussion to be able to respond to key questions or conversations when called upon. If the given user is not sufficiently attentive to the VOIP discussion at all times, they may also miss the context of the discussion just before a question is directed at them, which decreases the effectiveness of their participation in the VOIP meeting.

SUMMARY

Disclosed herein are systems and methods that may be implemented in a real time manner by an information handling system (the "client system") to monitor one or more characteristics of a voice over internet protocol (VOIP) discussion, to use these monitored VOIP characteristics to identify one or more condition/s in real time as they are identified to occur during the current VOIP discussion, and to determine to take one or more automatic actions based on the identified VOIP condition/s so as to inform and/or alert a current human user of the client system to the occurrence of the identified VOIP condition/s as they occur. The disclosed systems and methods may be implemented in one embodiment to facilitate effective collaboration by the client system user by enabling the client system user to pay attention when required during VOIP meetings or discussions being hosted for on the client system for the client system user.

Examples of VOIP discussion characteristics that may be monitored in real time include, but are not limited to, the identity of separate human speakers as they speak during the VOIP discussion, the recorded time of day (e.g., timestamp) at which each of the identified human speakers speaks during the VOIP discussion, the text (transcript) of the transcribed words spoken by each identified human speaker as they speak during the VOIP discussion, etc. Examples of VOIP conditions that may be identified as they occur from the monitored VOIP discussion characteristics include, but are not limited to, occurrence of a VOIP question directed by another VOIP discussion participant to the current client system user, occurrence of a VOIP discussion regarding a particular subject matter, the context of a VOIP discussion immediately preceding the occurrence of such a VOIP question or other event such as discussion of a particular subject matter, etc.

Examples of automatic actions that may be taken in real time based on identified VOIP discussion conditions include, but are not limited to, providing an alert (e.g., such as a displayed pop-up message, audio alert, or haptics alert) to the client system user, selecting and displaying transcribed textual portions of a VOIP discussion (e.g., transcript of a VOIP question directed to the current user, transcript of a selected portion of the VOIP discussion immediately preceding the occurrence of such a VOIP question or other event, etc.) to the client system user. Such automatic actions may be taken, for example, to selectively trigger key sections of a transcription of the VOIP discussion in real time during the VOIP discussion to alert the user to relevant important pre-context of the VOIP discussion, to alert the user to an actual question or discussion point requiring their attention, etc. In this way, the client system user may be prompted in real time to take key notes or to confirm and respond to or follow up on directed questions from other VOIP discussion participants to allow the current system user to appropriately respond to these questions in a timely fashion and while being made aware of relevant pre-context of these questions from other VOIP discussion participants. This advantageously facilitates the ability of the client system user to maintain focus and concentration (e.g., during a large VOIP discussion that has many participants) so that the client system user may more effectively participate in the VOIP discussion, even while multitasking.

The disclosed systems and methods may be further implemented in one embodiment to also monitor the current status of the client system user in real time during the VOIP discussion, and to use this monitored current client system user status as an additional factor to determine what type (or modality) of real time automatic action/s to take, and/or how to take these automatic action/s, based on a combination of the identified VOIP discussion condition/s and the monitored current client system user status.

Monitored current client system user status may in one embodiment include current activity of the client system user on the client system, e.g., such as what active user application is currently in focus on the user desktop of the client system. For example, when the client system user is multitasking with the current in-focus active application on the client system being different than the active application on the client system that is currently supporting the current VOIP discussion, then an automatic action may be selected to automatically display an alert to the user superimposed or over the displayed window of the current in-focus application, or to automatically change the current in-focus application to be the current VOIP application (e.g., such as Zoom, Skype, etc.). Examples of such different user applications that may be currently in-focus on the client system include, but are not limited to, a spreadsheet application, a slide presentation application, a word processing application, a PDF viewer application, a web browser application, an audio/visual player application, a computer game application, etc. In the case that the user is listening to audio (e.g., music, video soundtrack, etc.) on the client system that is different from the current VOIP discussion, then an automatic audio alert (e.g., beep, synthesized spoken alert, etc.) may be provided to the user on the currently active speakers and/or headphones of the client system to alert the user to return their attention to the current VOIP discussion on the client system.

In another embodiment, monitored current client system user status may include monitored current activity of the client system user on devices other than the client system. For example, a client system user that is participating in the current VOIP discussion may also be multitasking by simultaneously using at least one other device that is another information handling system that is different from the client system and that is not supporting the current VOIP discussion, such as a smart phone, a game console system, a tablet computer, a laptop computer, a desktop computer, etc. In such a case, an automatic action may be selected to automatically provide an alert to the user on the other device according to the type of user activity occurring on the other device. For example, if the user is currently talking on a smart phone, then an audio alert (e.g., beep, synthesized spoken alert, haptics vibration, etc.) may be automatically provided to the client system user on the smart phone to alert the client system user to return their attention to the current VOIP discussion occurring on the client system. In the same way, appropriate audio and/or visual alerts may be provided on the speakers and/or display devices of the other device to gain the attention of the client system user.

In one respect, disclosed herein is a method, including: providing in a first information handling system a voice over internet protocol (VOIP) audio output stream including incoming VOIP speech data of two or more VOIP speakers received from across a network; separating the VOIP audio output stream into two or more separate VOIP speaker streams that each correspond to a respective one of the two or more VOIP speakers, and transcribing each separate VOIP speaker stream to produce a separate speaker text channel that includes one or more VOIP text strings spoken by the corresponding one of the two or more VOIP speakers; comparing each of the separate speaker text channels in real time to one or more predefined keywords to identify a predefined keyword present within a current text string of one of the separate speaker text channels spoken by a first one of the two or more VOIP speakers; determining a predicted sequential correlation between the current text string containing the predefined keyword that is spoken by the first one of the VOIP speakers and one or more other text strings previously spoken by any of the two or more VOIP speakers; determining a current context of a user of the first information handling system; and selecting a predefined modality corresponding to the current context of the user of the first information handling system, and taking an action corresponding to the determined modality to alert the user of the first information handling system to the occurrence of the predicted sequential correlation between the current text string spoken by the first one of the VOIP speakers and the one or more other text strings previously spoken by any of the two or more VOIP speakers.

In another respect, disclosed herein is a system, including a first information handling system coupled to a network and including at least one programmable integrated circuit receiving a voice over internet protocol (VOIP) audio output stream including incoming VOIP speech data of two or more VOIP speakers received from across the network, the at least one programmable integrated circuit being programmed to: separate the VOIP audio output stream into two or more separate VOIP speaker streams that each correspond to a respective one of the two or more VOIP speakers, and transcribe each separate VOIP speaker stream to produce a separate speaker text channel that includes one or more VOIP text strings spoken by the corresponding one of the two or more VOIP speakers; compare each of the separate speaker text channels in real time to one or more predefined keywords to identify a predefined keyword present within a current text string of one of the separate speaker text channels spoken by a first one of the two or more VOIP speakers; determine a predicted sequential correlation between the current text string containing the predefined keyword that is spoken by the first one of the VOIP speakers and one or more other text strings previously spoken by any of the two or more VOIP speakers; determine a current context of a user of the first information handling system; select a predefined modality corresponding to the current context of the user of the first information handling system; and take an action corresponding to the determined modality to alert the user of the first information handling system to the occurrence of the predicted sequential correlation between the current text string spoken by the first one of the VOIP speakers and the one or more other text strings previously spoken by any of the two or more VOIP speakers.

DESCRIPTION OF ILLUSTRATIVE EMBODIMENTS

Figure 1:
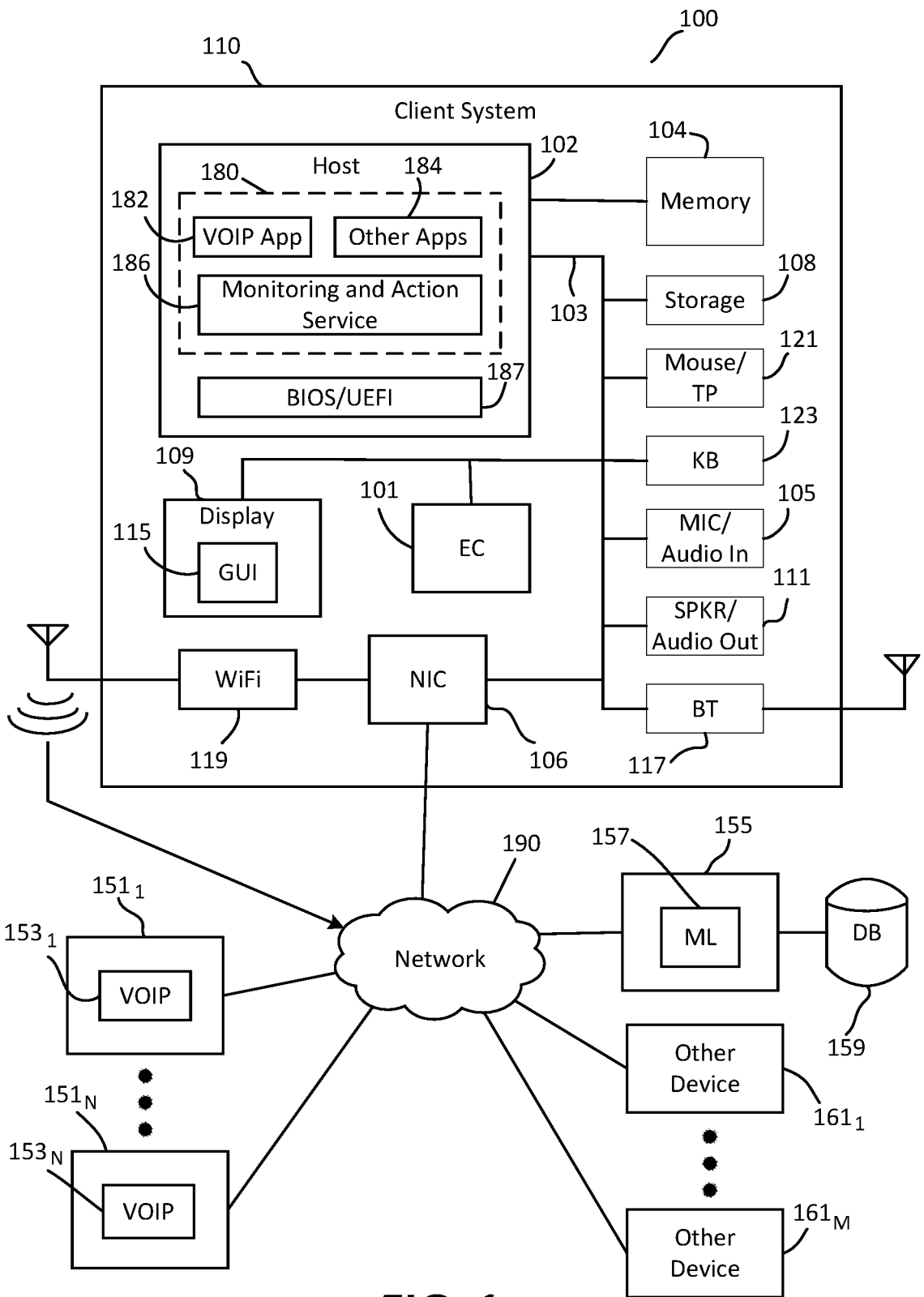
FIG. 1 illustrates a network environment according to one exemplary embodiment of the disclosed systems and methods.

FIG. 1 illustrates one exemplary embodiment of a network environment 100 that includes multiple information handling systems 110, $151_1$-$151_N$, $161_1$-$161_M$, and 155 that are in communication (e.g., via TCP/IP or Internet protocol) with each other across a network 190, such as the Internet or a corporate intranet. Each of information handling systems 110, $151_1$-$151_N$ and $161_1$-$161_M$ may be operated by a human user and may be, for example, a non-mobile desktop or tower computer, a mobile system such as notebook or laptop computer, tablet computer, smart phone, etc. Information handling system 155 may be a web server or other backend machine including at least one programmable integrated circuit that executes machine learning logic 157 described further herein. As shown, server 155 may be coupled to non-volatile storage 159 that stores a backend storage and machine learning database for use by machine learning logic 157, and for keywords setting and preferred alert modality for user by context.

In FIG. 1, client system 110 includes at least one host programmable integrated circuit programmable integrated circuit 102 (e.g., AMD or Intel-based central processing unit "CPU" or other type of suitable programmable integrated circuit) coupled to system volatile memory (e.g., dynamic random access memory "DRAM") 104. Host programmable integrated circuit 102 is also coupled via one or more buses/communication media 103 (e.g., such as a platform controller hub "PCH" that couples together PCIe bus, USB, SMBus, SATA, other appropriate data buses such as memory bus, etc.) to non-volatile storage 108 (e.g., hard drive/s, solid state drive/s "SSDs" and or other non-volatile memory) and other system components described further herein. In this way, buses/media 103 provide a mechanism for the various components of system 110 to communicate and couple with one another.

In FIG. 1, the host programmable integrated circuit 102 of client system 110 executes a version of the active application 182 on a host operating system (OS) 180 (e.g., Microsoft Windows-based OS, Linux-based OS, Android OS, iOS, etc.). Client system 110 also include an embedded controller (EC) 101 coupled to bus/es and/or PCH 103 that may be programmed, for example, to perform functions such as power/thermal system management, muting audio out, etc. As shown, system 110 may be provided as shown with a network interface card (NIC) 106 that is communicatively coupled via wired and/or wireless (e.g., via Wi-Fi RF radio module 119) connection to network 190 (local area network "LAN", Internet and/or corporate intranet, etc.) to allow various components of system 110 to communicate through NIC 106 with components of other devices $161_1$-$161_M$, and 155. System 110 may also optionally include a Bluetooth radio and connection module 187 coupled as shown for providing direct Bluetooth communication with one or more other devices $161_1$-$161_M$ that are Bluetooth capable.

As further shown in FIG. 1, client system 110 includes video display device 109 (e.g., LCD display, LED display, etc.) displaying graphical user interface (GUI) 115. In one embodiment, display 109 and GUI 115 may be optionally integrated into one component (e.g., LCD or LED display touchscreen device) for displaying visual information (including a graphics scene 117 generated by active application 182) to a human user and optionally for receiving user input from a human user. Client system 110 also may include other input/output (I/O) component/s such as keyboard 123 and mouse and/or touchpad 121 as shown for receiving user input. Not shown are separate keyboard controller and mouse/touchpad controller that may be coupled between host programmable integrated circuit 102 and keyboard 123 and mouse/touchpad 121, respectively. Display 109 may be coupled to bus 103 as shown and/or may be optionally coupled directly to host programmable integrated circuit 102 depending on the particular configuration of the given system (e.g., coupled directly to integrated graphics of host programmable integrated circuit 102 and/or separately coupled via bus 103 to receive video information from an optional graphics processor unit "GPU" not shown).

Other components of client system 110 that may be coupled to host programmable integrated circuit 102 via bus/es 103 include, but are not limited to, microphone and audio-in circuitry 105 (e.g., analog to digital conversion, audio encoding, etc.) that receives analog sounds such as system user voice input to VOIP discussions, and speaker and audio-out circuitry 111 (e.g., audio decoding and digital to analog conversion, amplifier, etc.) that outputs sounds (e.g., application-generated sounds, VOIP discussions, etc.) to the system user.

Still referring to FIG. 1, host programmable integrated circuit 102 on client system 110 may be operated by a system user to execute an active voice over internet protocol (VOIP) application 182 (e.g., Zoom, Skype, etc.) that is interacting across network 190 during a given VOIP discussion session with other instances $153_1$-$153_N$ of the same type VOIP application executing on respective programmable integrated circuits of the other information handling systems $151_1$-$151_N$. In this way, the respective users of systems 110 and $151_1$-$151_N$, may conduct the VOIP discussion session with other across network 190. Also executing on host programmable integrated circuit 102 may be one or more other active applications 184 (e.g., such as a spreadsheet application like Microsoft Excel, a slide presentation application like Microsoft PowerPoint, a word processing application like Microsoft Word, a PDF viewer application such as Adobe Acrobat, a web browser application such as Microsoft Edge, an audio visual player application like Microsoft Windows Media Player, a computer game application like Call of Duty, etc.).

Also shown executing on host programmable integrated circuit 102 of client system 110 is a monitoring and action software service 186 that executes in the background to perform multiple tasks which include, but are not limited to, monitoring characteristic/s of a VOIP discussion, identifying one or more VOIP condition/s in real time from the monitored VOIP characteristic/s, and determining and taking one or more automatic actions based on the identified VOIP condition/s. Operation of monitoring and action software service 186 is further described and illustrated in FIG. 2. In addition to monitoring and action software service 186, host programmable integrated circuit 102 also executes basic input/output system (BIOS) or Unified Extensible Firmware Interface (UEFI) for client system 110 as shown.

Still referring to FIG. 1, each of other systems $151_1$-$151_N$, other devices $161_1$-$161_M$, and web server 155 may include various components that are configured to operate and function similar to one or more corresponding components of system 110, e.g., such as one or more of a host programmable integrated circuit coupled to system memory and executing logic programmed to perform the appropriate functions of each respective system or device, NIC for network communication, storage, display, I/O devices for user interaction with system components, microphone/audio in circuitry and speaker/audio out circuitry, etc.

Figure 2:
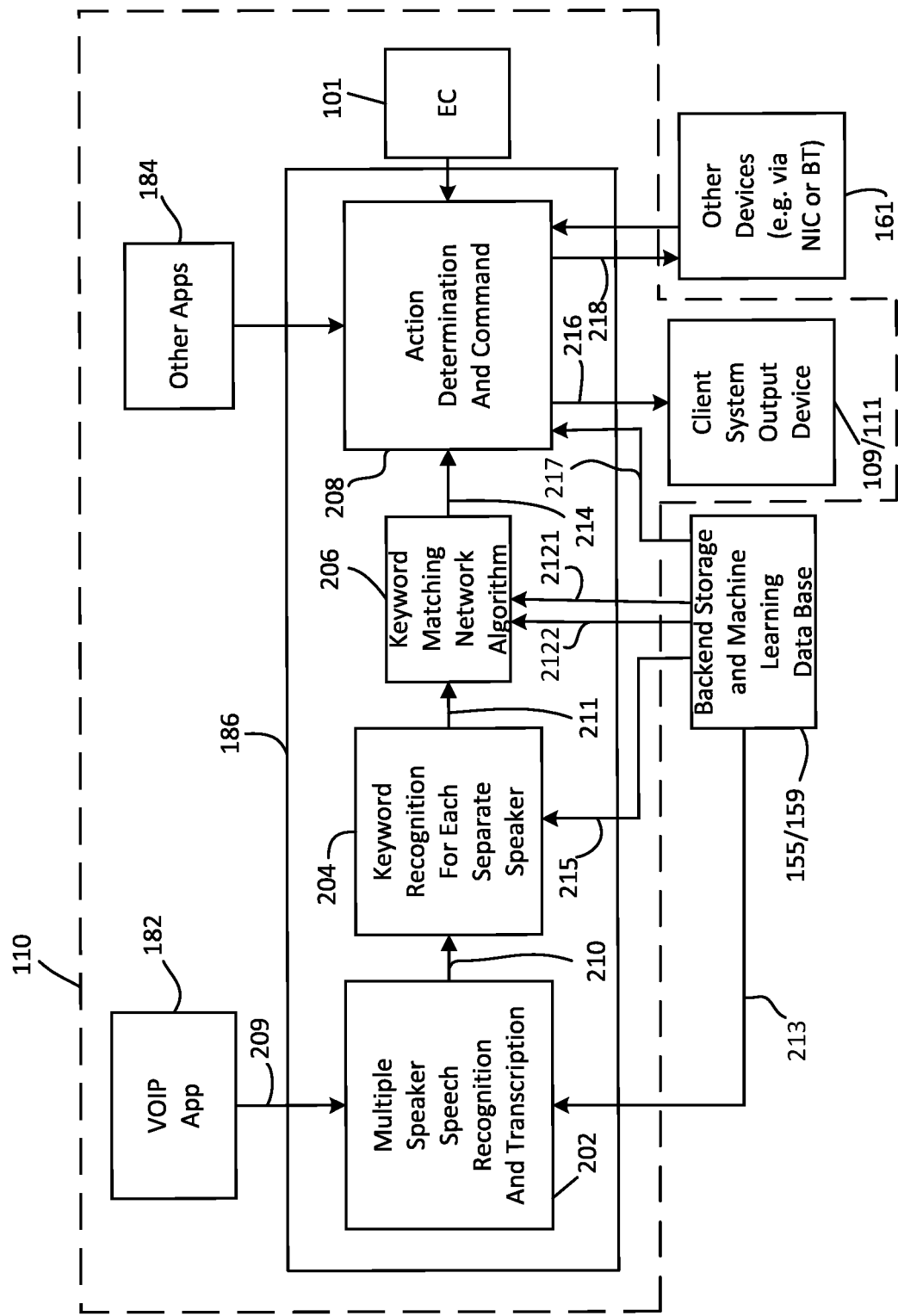
FIG. 2 illustrates logic architecture of a monitoring and action software service according to one exemplary embodiment of the disclosed systems and methods.

FIG. 2 illustrates one exemplary embodiment of a logic architecture of monitoring and action software service 186 as it may execute in steady state on client system 110 during a current VOIP discussion session (e.g., conference call or meeting) held between client system 110 and other systems $151_1$-$151_N$. As shown in FIG. 2, a digital VOIP audio output stream 209 from VOIP application 182 may be captured and sorted in real time by monitoring and action software service 186, e.g., at the same time that the VOIP audio output stream 209 is also provided to speaker and audio-out circuitry 111 for audio playback to current user of client system 110. VOIP audio output stream 209 may include incoming VOIP speech data from multiple human users of other systems $151_1$-$151_N$ that are participating as respective VOIP speakers in the current VOIP discussion session.

As shown in FIG. 2, logic of monitoring and action software service 186 may perform multiple speaker speech recognition and real time speech-to-text transcription tasks 202 on the data of VOIP audio output stream 209 as it is provided in real time from the VOIP discussion by VOIP application 182. In one embodiment, tasks 202 may be performed by downloading trained users' voice characteristics 213 of Backend storage and Machine Learning Database 159 across network 109 from server 155. As described further herein, these downloaded trained users' voice characteristics 213 may be adaptively machine-learned by machine learning logic 157 executing on server 155. These tasks include utilizing a speech recognition algorithm to separate the VOIP audio output stream 209 into one or more VOIP speaker streams (i.e., with each stream corresponding to respective individual VOIP speaker participating in the current VOIP discussion session), and then to real time transcribe each given VOIP speaker stream into a corresponding separate text channel for that given VOIP speaker versus time (e.g., such as time of day) so as to produce one or more separate VOIP speaker text channels 210 that each correspond to a given VOIP speaker versus time as illustrated by the mixed speech extraction of VOIP text strings spoken by multiple (e.g., three or more) VOIP speakers shown in FIG. 3 (in this case VOIP speaker D represents the current client system user of client system 110 and VOIP speakers A, B and C are users of other systems 151). In one embodiment, a temporary N seconds buffer (e.g., finite-sized sliding buffer window of 60 seconds or any other suitable greater or lesser time duration sliding window buffer time) may be employed to retain N seconds of separate VOIP text channels in buffer memory for this task by monitoring and action software service 186.

Examples of speech recognition algorithms that may be employed during multiple speaker speech recognition and real time speech-to-text transcription tasks 202 include, but are not limited to, Permutation Invariant Training, Artificial Neural Networks, Deep/Machine Learning, or other suitable algorithms. Examples of transcription algorithms that may be employed include, but are not limited to, recurrent neural network trained algorithm, fast Fourier transform (FFT) synthesis, hidden Markov model (HMM) based recognition, etc.

Figure 3:
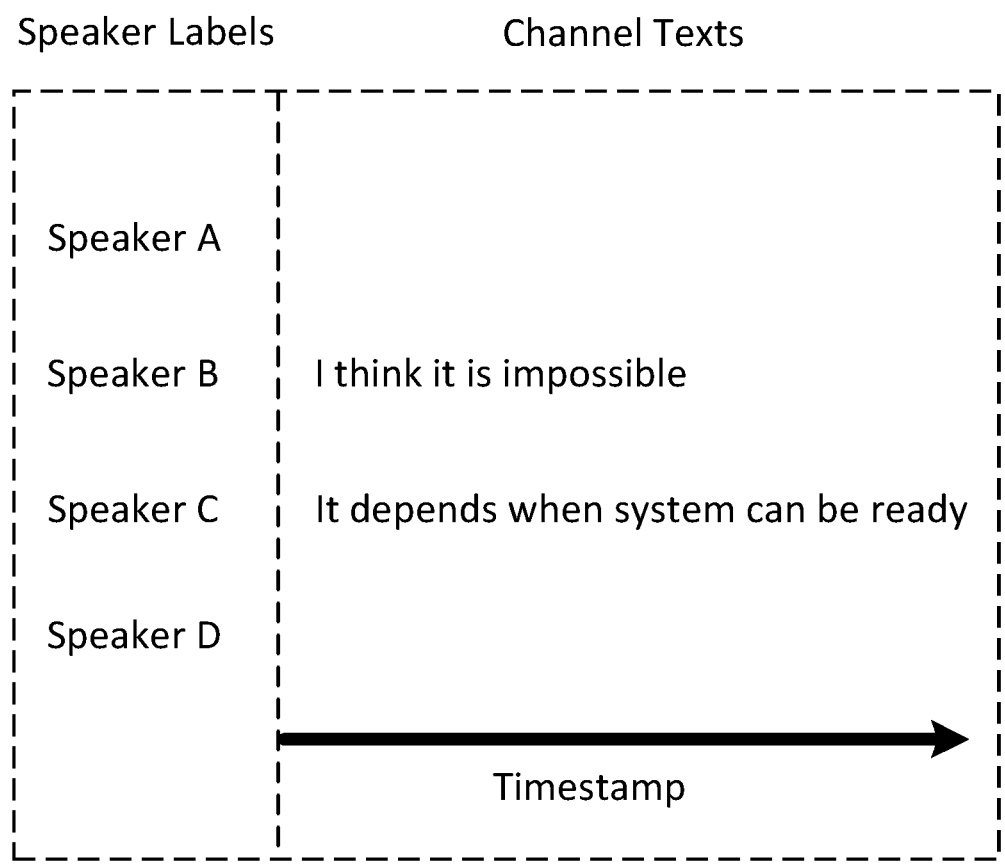
FIG. 3 illustrates mixed speech extraction of VOIP text strings spoken by multiple VOIP speakers according to one exemplary embodiment of the disclosed systems and methods.

Next, as shown in FIG. 2, logic of monitoring and action software service 186 may perform keyword recognition task 204 in real time for each separate VOIP speaker text channels 210 (such as those channels illustrated by mixed speech extraction versus time in FIG. 3). In one embodiment, task 204 may be performed by downloading at least one pre-defined keyword 215 of Backend storage and Machine Learning Database 159 across network 109 from server 155. In one embodiment, the at least one pre-defined keyword 215 may be more than one keyword. As described further herein, the downloaded pre-defined keyword 215 may be a trigger when it is recognized to exist within any of VOIP speaker text channels 210. As described further herein, when it is recognized that a given VOIP speaker text channel 210 includes the pre-defined keyword 215, then the given VOIP speaker text channel 210 including the marked pre-defined keyword 211 is provided to task 206.

Figure 4:
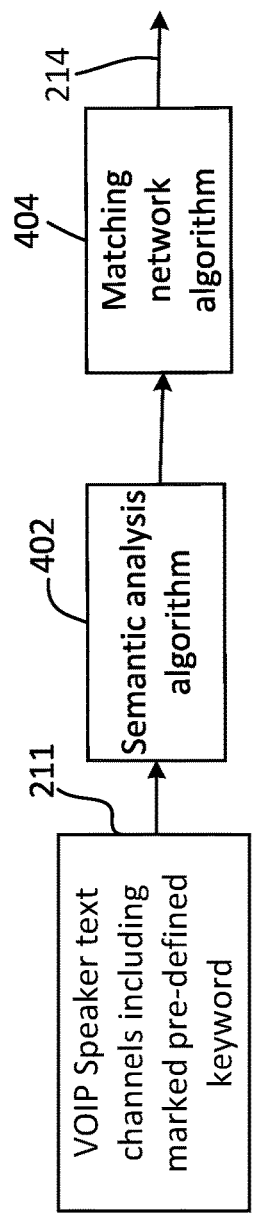
FIG. 4 illustrates keyword matching network algorithm analysis according to one exemplary embodiment of the disclosed systems and methods.

As shown, keyword matching network algorithm task 206 may be performed in real time by logic of monitoring and action software service 186 to determine correlation of each text string (e.g., which may be a separate sentence spoken by one speaker) present in VOIP speaker text channels that include marked pre-defined keyword 211 based on the reference of the text string including the pre-defined keyword. This is done in task 206 using analysis by semantic analysis algorithm 402 of FIG. 4 to determine and provide a respective semantic coefficient for each text string present in the combination of VOIP speaker text channels including the marked pre-defined keyword 211 of FIG. 4. With the semantic coefficient of each text string being so determined, matching network algorithm 404 may be performed in real time to calculate a weighting of each given text string based on a respective speaker label coefficient, a respective timestamp coefficient and a respective semantic coefficient that are each determined for that given text string to provide the predicted correlated text strings 214.

In one embodiment, task 206 may be performed by downloading a pre-defined timestamp duration 2122 of Backend storage and Machine Learning Database 159 across network 109 from server 155 for use in determining a timestamp coefficient. In one embodiment, the end timestamp of the text string containing the pre-defined keyword may be set to start, and the timestamp coefficient will be gradually smaller than 1 and end with 0 to fulfill the requirement of timestamp duration setting. In one embodiment, a speaker label coefficient may be defined using the logic rule that if one speaker continues to speak two or more text strings during the pre-defined timestamp duration 2122, then the speaker label coefficients for those text strings may be greater than 1 for each text string. If not, the speaker label coefficient will be equal to 1. In one embodiment, the predefined timestamp duration 2122 may be the same as the N seconds buffer.

Figure 5:
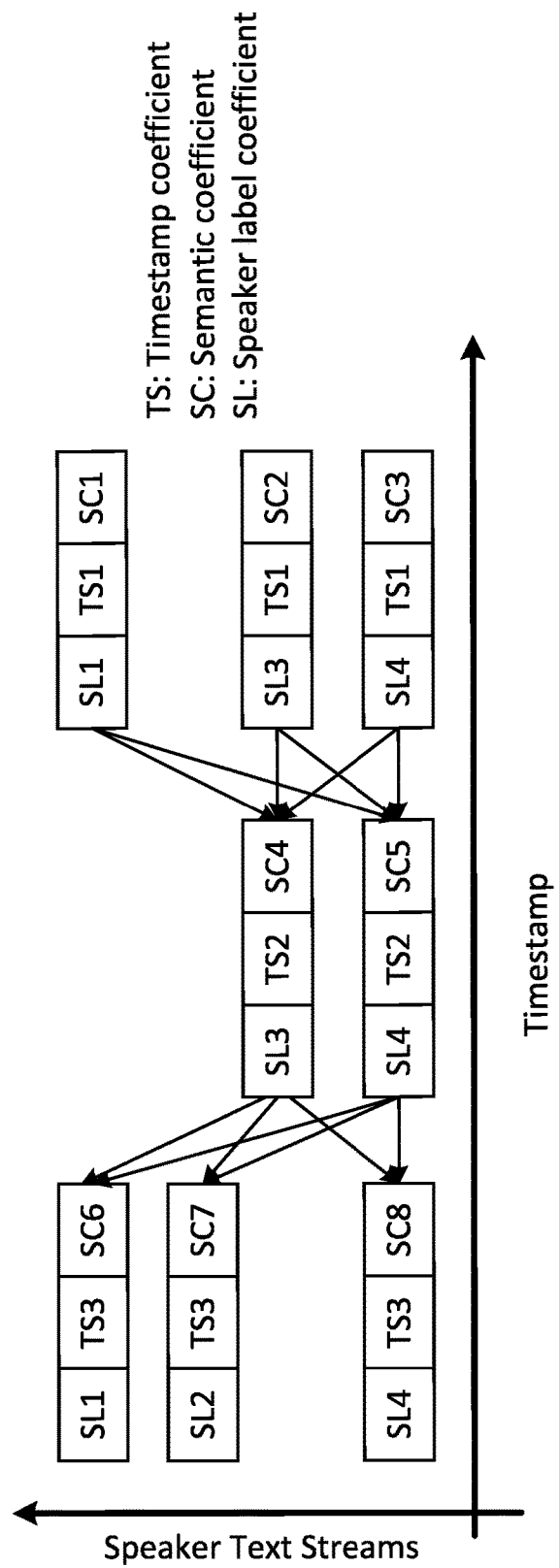
FIG. 5 illustrates matching network analysis according to one exemplary embodiment of the disclosed systems and methods.

FIG. 5 illustrates one exemplary embodiment of matching network algorithm 404 as it may be applied to provide a semantic coefficient (SC) of each text string in VOIP speaker text channels including the marked pre-defined keyword 211 versus time (in this case a timestamp "TS" measured relative to when the marked pre-defined keyword 211 was spoken). As shown in FIG. 5, each given detected VOIP text string from each speaker text stream is provided a timestamp (TS)

coefficient (e.g., corresponding to, or measured relative to, when the VOIP text string including the pre-defined keyword was spoken—for example, TS1 may be 1.0, TS2 may be 0.7 and TS3 may be 0.5 or any other relative time stamp coefficient weighting as may be predefined and/or specified by a client system user), and a speaker label coefficient (SL) that provides higher weighting if the speaker continues speaking across two or more timestamp coefficients (e.g., such as SL3 continues in both TS1 and TS2 in FIG. 5). In one embodiment, a semantic coefficient (SC) that indicates the relative degree of correlation between the text string that includes the pre-defined keyword and each other given detected VOIP text string. Arrows in FIG. 5 illustrate different possible paths for a predicted correlated text string. Using a calculation among SL, SC and TS, the highest weighting of each text string in each specific timestamp coefficient may be selected to provide predicted correlated text strings 214.

In one exemplary embodiment, main words tuples 2121 may be predetermined using offline machine learning training (e.g., such as machine-learned main words tuples or ordered sequences of main words from different VOIP speakers or the same speaker), and then may be later downloaded when needed to system 110 across network 109 from Backend storage and Machine Learning Database 159 of server 155. One example of such a main words tuples 2121 is an occurrence of a first main word in the text string that includes the pre-defined keyword 211 immediately following an occurrence of a second main word in a prior second main word stream in 211 (corresponding to a text string spoken by a second VOIP speaker or same VOIP speaker), e.g., a tuple of the form "{Bob_Said_This, Then_John_Said_This, . . . } or {Speaker_A_Said_This, Then_Speaker_C_Said_This, . . . }". Thus, main words tuples 2121 and machine-learning may use semantical constructions to train context behind sequences of main words spoken by different VOIP speakers or the same VOIP speaker, e.g., by training context behind each detected tuple or ordered sequence of main words from different VOIP speakers or the same VOIP speaker. Examples of machine learning methods employing semantical constructions that may be employed to perform such context training include, but are not limited, to ELMo, BERT, etc.

Figure 6:
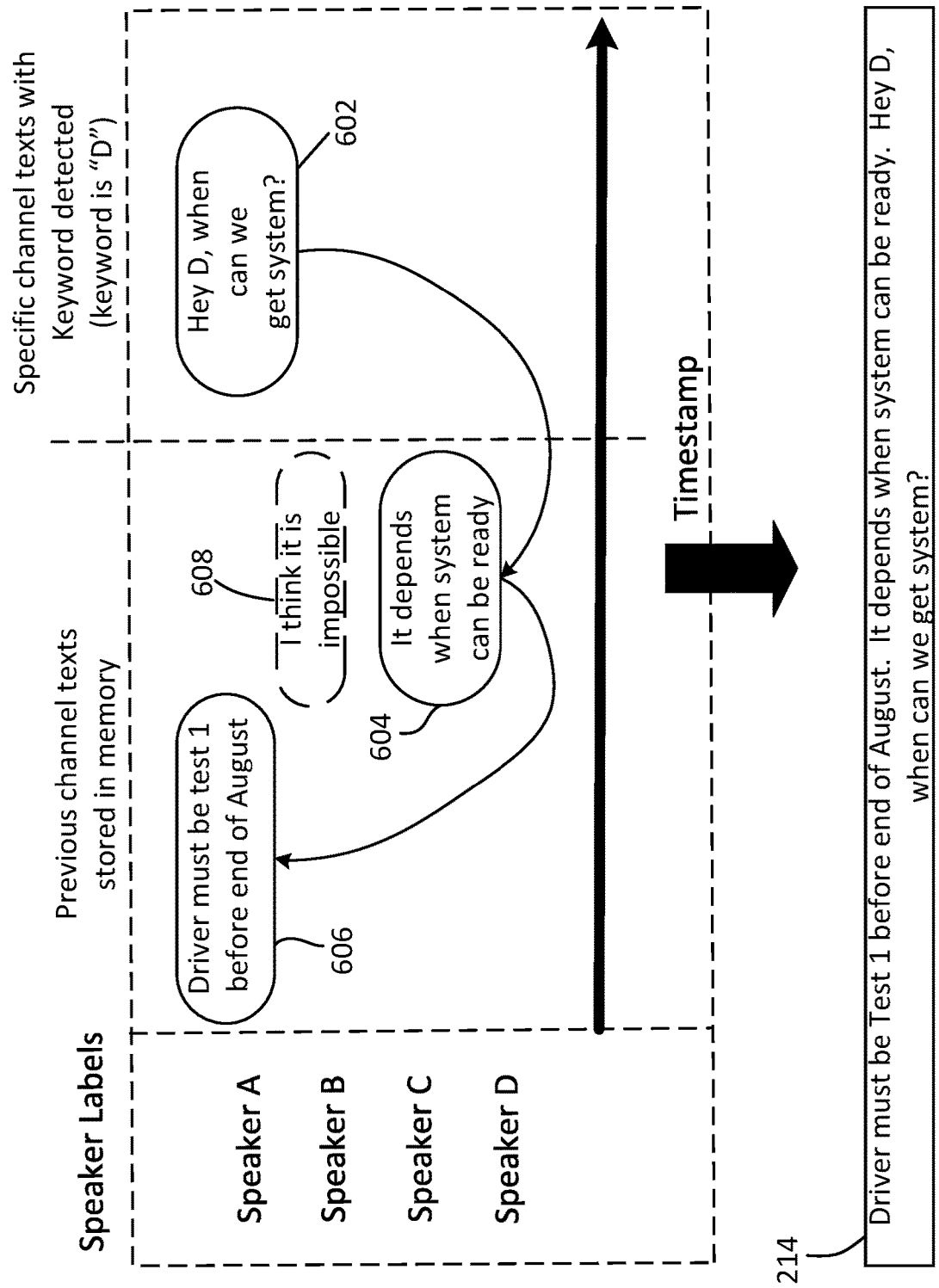
FIG. 6 illustrates generation of a predicted correlated text output according to one exemplary embodiment of the disclosed systems and methods.

In one embodiment, semantic coefficients may be calculated for each given VOIP text string within the VOIP speaker text channel/s including a marked pre-defined keyword 211 by comparing each given VOIP text string to the VOIP text string that includes the pre-defined keyword to determine and assign a semantic coefficient to the given VOIP text string. This is illustrated in FIG. 6, where the detected keyword is "D" (e.g., the client system user's name) spoken by speaker A during a VOIP text string 602 "Hey D, when can we get system?". In FIG. 6, other previously-spoken VOIP text strings 604, 606 and 608 are contained in the same temporary N seconds buffer, and analyzed using predicted correlation analysis of matching network algorithm 404. It is noted that VOIP text string 602 is contained within the most recent time stamp period of the N seconds buffer, simultaneously-spoken VOIP text strings 604 and 608 are contained within the next most recent time stamp period of the N seconds buffer, and VOIP text string 606 is contained within the least recent time stamp period of the N seconds buffer. It is also noted that the duration of the N seconds buffer may vary (e.g., per user selection) and may be longer to contain more than three time stamp periods, or may be shorter to contain less than three time stamp periods.

In this example of FIG. 6, key word recognition task 204 analyzes VOIP text strings 602, 604, 606 and 608 of the N seconds buffer, and identifies presence of a pre-defined keyword within text string 602 (in this case an occurrence of a spoken keyword "D"). Next, keyword matching network algorithm logic 206 may apply a main words tuples 2121 (e.g., tuple of {It depends when system can be ready ; Hey D, when can we get system?}) to construct the semantic structure apply to VOIP text strings 602, 604, 606 and 608, and then determines to assign respective semantic coefficients to VOIP text strings 602, 604, 606 and 608.

For example, in one embodiment text string 602 may be assigned a semantic coefficient (SC) of 1 since it is a VOIP text string that includes a pre-defined keyword. Then, based on determined correlation degree, text string 604 has the highest correlation to text string 602 due to matching the above main words tuple 2121. Other text strings 608 and 606 have a lower correlation to text string 602 than does text string 604 since text strings 608 and 606 do not match a main words tuple 2121, and such that text string 604 has a higher correlation to text string 602 than does text string 608 which is spoken at the same time stamp. Note that in this example, when a pre-defined duration of a timestamp is set equal to N seconds buffer, there is no need to apply a timestamp coefficient (TS) to control the time length of predicted correlated text strings 214. Also, in this example, there are no two text strings that are spoken by the same VOIP speaker in two sequential adjacent timestamps, so the speaker label coefficient (SL) for each text string 602, 604, 606 and 608 is 1.

Therefore, the predicted correlated text strings may be selected in this embodiment as follows by predicted correlation analysis of matching network algorithm 404. Text string 602 that includes the trigger keyword and that has the pre-defined keyword is automatically selected to be the predicted correlated text string from the most recent time stamp period of the N seconds buffer since it has the trigger keyword. Next, since the correlation weighting of text string 604 is determined to be greater than text string 608 (i.e., because text string 604 includes a pre-defined tuple and text string 608 does not), then text string 604 (rather than simultaneous text string 608) is selected to be the single predicted correlated text string selected from the next most recent time stamp period of the N seconds buffer. Text string 606 is selected to be the predicted correlated text string from the least recent time stamp period of the N seconds buffer since it is the only text string present in the least recent time stamp period of the N seconds buffer. Thus, the resulting predicted correlated text strings 214 are determined in FIG. 6 to be: "The driver must be Test before end of August. It depends when system can be ready. Hey D, when can we get system?".

As shown, the predicted correlated text strings 214 are provided in real time to action determination and command task 208 performed by logic of monitoring and action software service 186. Also provided to action determination and command task 208 may be data provided internally from components of system 110 that is indicative of the monitored real time current activity of the client system user on the client system 110 (e.g., status of audio output 111 and/or audio input 105 as provided from EC 101, as well as status of one or more other current active applications 184, etc.).

Monitored current activity of the client system user on one or more other devices $161_1$-$161_M$ (i.e., other than the client system 110) may also be provided in real time by these device/s 161 to monitoring and action software service 186 executing on system 110 (e.g., using REpresentational State Transfer such as RESTful P2P communication, browser based messages for web, etc. via Bluetooth connection, Wi-Fi connection, Internet connection, etc.) and then utilized in action determination and command task 208 as shown in FIG. 2. In one embodiment a software service or agent may be executing on one or more of other devices $161_1$-$161_M$ may automatically communicate the monitored current activity to monitoring and action software service 186. Examples of monitored current activity of the client system user on one or more devices 161 include, but are not limited to, talking on a smart phone, playing a computer game on a game console system, browsing the Internet on a tablet computer, creating graphics on a laptop or desktop computer workstation, etc.

Action determination and command task 208 may determine a predefined action (modality) that corresponds to the identified predicted correlated text strings 214. Such a determination may be made based, for example, on a lookup table or other relationship of actions/modalities (e.g., predefined actions (modalities) may be downloaded as data 217 to system 110 across network 109 from Backend storage and Machine Learning Database 159 of server 155) that correspond to different combinations of predicted correlated text strings 214 and monitored current activity of the client system user on the current system 110 or one of other devices 161. In one embodiment, the monitored current activity of the client system user may be used to determine whether the client system user is attentive and monitoring the current VOIP discussion or is distracted and not monitoring the current VOIP discussion session. A different alert (modality) may be selected to be displayed or otherwise provided to the correct system or device (e.g., the client system 110 or another device 161) to which the client system user is currently directing their attention.

For example, when the client system user D is multitasking with the current in-focus active application 184 on the client system being different than the currently-active VOIP application 182 on the client system 110, then an automatic action may be selected to automatically display an alert (e.g., including the predicted correlated text strings 214 for the determined current VOIP condition) to the client system user D superimposed or over the displayed window of the current in-focus application 184 on display device 109, or to automatically change the current in-focus application 184 to be the current VOIP application 182 (e.g., such as Zoom, Skype, etc.) with the superimposed alert window (e.g., including the predicted correlated text strings 214 for the determined current VOIP condition). In the case that the client system user D is listening to audio output circuitry 105 (e.g., music, video soundtrack, etc.) on the client system 110 that is different from the current VOIP discussion or the audio output circuity 105 is muted, then an automatic audio alert (e.g., beep, synthesized spoken alert, etc.) may also be provided to the client system user D via speakers and/or headphones of the client system 110 together with an alert window (e.g., including the predicted correlated text strings 214 for the determined current VOIP condition) to alert the client system user D to return their attention (and respond where appropriate) to the current VOIP discussion on the client system 110.

In the case that the monitored current activity of the client system user D is multitasking by using a device 161 other than the client system 110, then an additional automatic action may be selected to automatically provide an alert to the user on the other device 161 according to the type of user activity occurring on the other device. For example, if the client system user D is currently talking on (or looking at) a smart phone 161 with speaker/audio out circuitry 111 of client system 110, then an audio alert (e.g., beep, synthesized spoken alert, haptics vibration, etc.) may be automatically provided to the client system user D on the smart phone 161 to alert the client system user D to return their attention to the current VOIP discussion occurring on the client system 110. A visual/text alert may additionally or alternatively be provided on a display (if any) of the other device 161 that instructs the client system user D to return their attention to the current VOIP discussion occurring on the client system 110. Other types of alerts that may be provided to other devices 161 include, but are not limited to, a Bluetooth peer-to-peer (p2p) stream alert. In any case, the predicted correlated text strings 214 for the determined current VOIP condition may at the same time be displayed to the client system user D display device 109 of client system 110 for viewing and response by the client system user D when they return their attention to the VOIP discussion on client system 110.

Figure 7:
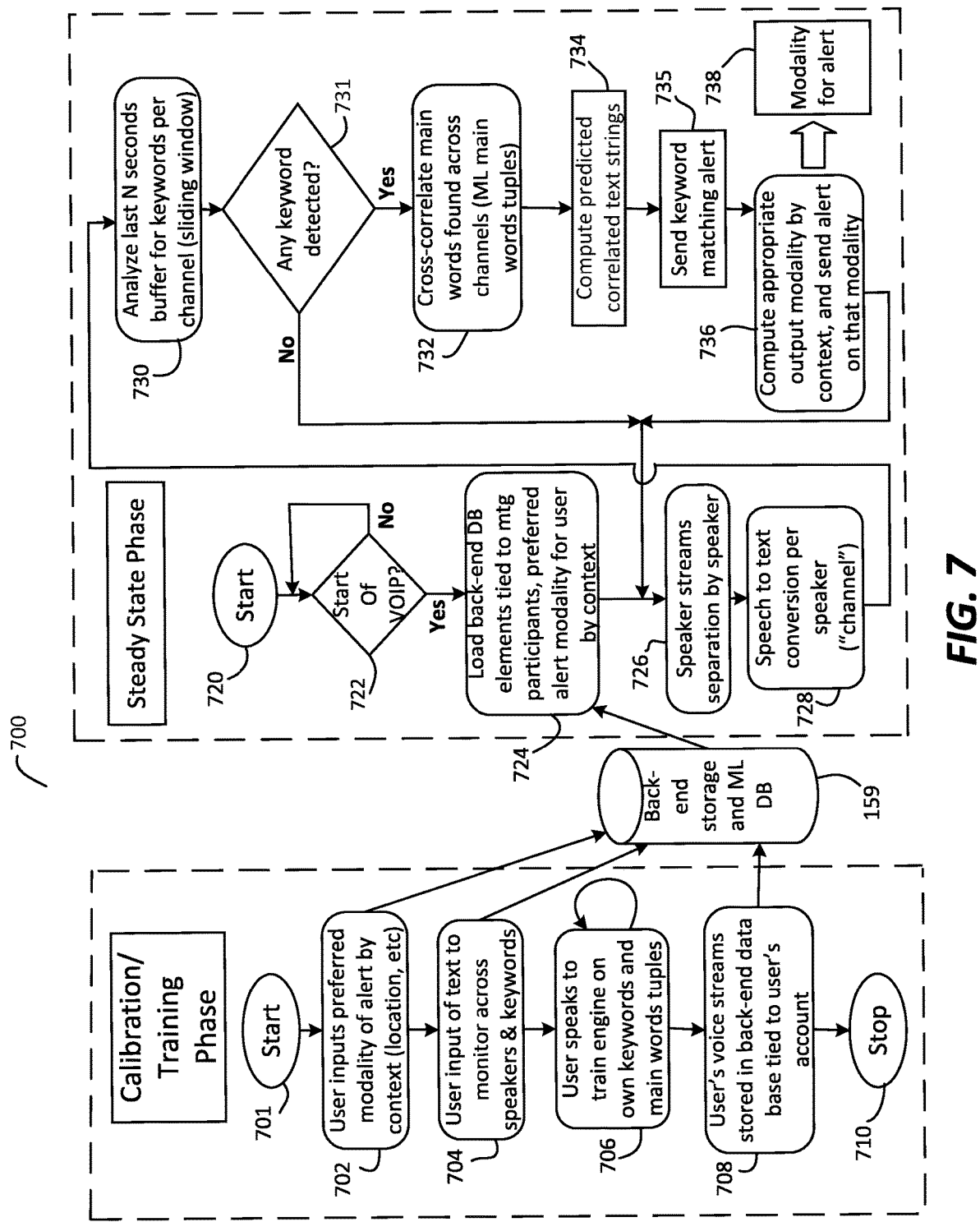
FIG. 7 illustrates methodology according to one exemplary embodiment of the disclosed systems and methods.

FIG. 7 illustrates methodology 700 according to one exemplary embodiment of the disclosed systems and methods that may be performed using the systems and components previously described and illustrated herein. As shown, methodology 700 includes both a calibration/training phase that may be performed prior to initiating a VOIP discussion session, and a steady state phase that may be performed during the initiated VOIP discussion session. Methodology 700 may be performed in one embodiment by monitoring and action software service logic 186 executing on client system 110 in combination with machine learning logic 157 and/or Backend storage and Machine Learning Database 159 of server 155 where noted.

Still referring to FIG. 7, steps of calibration/training phase of methodology 700 are coordinated and performed by logic of monitoring and action software service logic 186 on client system 110 except where otherwise noted, and begin at step 701. Calibration/training phase of methodology 700 then moves to step 702 where the client system user D (e.g., speaker "D" in the examples herein) inputs the selected (e.g., preferred) modality of alert by context (e.g., location, device focus or speaker status, etc.) and duration of timestamp (e.g., 60 seconds or the same duration as the N seconds buffer setting) for storage in Backend storage and Machine Learning Database 159 of server 155, e.g., via keyboard 123 and/or mouse/touchpad 121 of client system 110. In step 704, the client system user D inputs as text their selected keywords, e.g., via keyboard 123 and/or mouse/touchpad 121 of client system 110. In step 706, the client system user D speaks their selected keywords and/or main words tuples 2121 to machine learning logic 157 executing on server 155, e.g., via microphone/audio input circuitry 105 of client system 110. Step 706 may be iteratively repeated by the client system user D as shown to train a logic engine of machine learning 157 to correctly recognize learned voice characteristics 213 of the client system user D and learned main words tuples 2121. Next, in step 708, the learned voice characteristics 213 and learned main words tuples 2121 from step 706 are stored in Backend storage and Machine Learning Database 159 as shown. Calibration/training phase of methodology 700 then terminates in step 710. It will be understood that besides the learning of step 706, the selected keywords and main tuples 2121 may be predefined and stored on Backend storage and Machine Learning Database 159 in any other suitable alternative way.

The steps of steady-state phase of methodology 700 are next performed by logic of monitoring and action software service logic 186 on client system 110 (except where otherwise noted), and these begin as shown at step 720. Steady-state phase of methodology 700 then moves to step 722 where activity of VOIP application 182 is monitored to detect that a VOIP discussion including client system 110 and client user D has started. Once such a VOIP discussion session has been started, steady-state phase of methodology 700 proceeds to step 724 where monitoring and action software service logic 186 loads data from Backend storage and Machine Learning Database 159, including elements tied to meeting participants (e.g., such as learned voice characteristics 213 for client user D, learned main words tuples 2121, pre-defined keyword 215) and the selected alert modality or modalities previously entered by client system D in step 702.

Next, steady-state phase of methodology 700 proceeds to step 726 where VOIP audio output stream 209 from VOIP application 182 (e.g., including incoming VOIP speech stream data from multiple other VOIP speakers A, B and C) is captured and sorted in real time by monitoring and action software service 186 as previously described in relation to FIG. 2. In step 726, VOIP audio output stream 209 is separated into one or more separate VOIP speaker streams (e.g., corresponding to one or more of other VOIP speakers A, B and/or C). Speech-to-text conversion is then performed on each of the separate VOIP speaker streams in step 728 to produce separate VOIP speaker text channels 210 that each correspond to a given VOIP speaker. Then in step 730, monitoring and action software service 186 may analyze the last N seconds worth of the separate VOIP speaker text channels 210 to determine the presence of pre-defined keyword 215 of step 704 within any of separate VOIP speaker text channels 210. If not, then steady-state phase of methodology 700 repeats from step 731 to step 726 as shown, and steps 726 to 731 repeat. However, if pre-defined keyword was detected to be present in multiple separate VOIP speaker text channels 210 during step 730, then steady-state phase of methodology 700 proceeds from step 731 to step 732 for identification and cross-correlation of any main words found in multiple separate VOIP speaker text channels 210 based on detected presence of machine-learned main words tuples 2121 of step 706 to identify a VOIP condition (e.g., predicted correlated text strings 214) as previously described.

Next, in step 734, an overall weighting value is determined for each VOIP speaker text string based on a combination of its timestamp coefficient (TC), speaker label coefficient (SL) and semantic coefficient (SC), e.g., by adding these separate coefficients together, averaging these separate coefficients, etc. Then predicted correlated text strings are determined in step 734 based on highest weighting value at each timestamp, e.g., a given text string having the highest determined overall weighting value (highest combined weighting score) at each given time stamp is selected to be a correlated text string for that time stamp. Then steady-state phase of methodology 700 proceeds to step 736 where action determination and command task 208 may be performed by logic of monitoring and action software service 186 to select a predefined action (modality) that corresponds, for example, to an identified VOIP condition (e.g., predicted correlated text string/s 214) of step 734. In one embodiment, a predefined action may be an alert that is provided in step 738 according to the selected modality, such as described in relation to FIG. 2. Steady state phase of methodology 700 then returns to step 726, and repeats as shown. In this way, keyword spotter may be mapped to contextual alerts. For example, keyword sequences detected in separate VOIP speaker text channels 210 may be adap-tively correlated to capture group interactions, and then to contextually alert the client system user on the right alert modality, e.g., in a way to preserve the tradeoff of user attention in large VOIP meetings without compromising multi-tasking/productivity options.

It will be understood that methodology of FIG. 7 is exemplary only, and that any combination of fewer, additional and/or alternative steps may be employed that are suitable for monitoring and using one or more characteristics of a VOIP discussion to identify one or more condition/s in real time as they are identified to occur during the current VOIP discussion, and determining and taking one or more automatic actions based on the identified VOIP condition/s so as to inform and/or alert a client system user to the occurrence of the identified VOIP condition/s as they occur.

It will also be understood that one or more of the tasks, functions, or methodologies described herein (e.g., including those described herein for components 101, 102, 105, 106, 108, 109, 111, 117, 119, 151, 155, 157, 159, 161, 180, 182, 184, 186, 187, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method, comprising:
    providing in a first information handling system a voice over internet protocol (VOIP) audio output stream including incoming VOIP speech data of two or more separate and different VOIP human speakers received in the first information handling system from across a network, the two or more separate and different VOIP human speakers being respective different human users of two or more separate and different information handling systems that are different from the first information handling system and that are coupled across the network to the first information handling system;
    separating the VOIP audio output stream into two or more separate and different VOIP speaker streams that each correspond to a respective separate and different one of the two or more VOIP human speakers, and transcribing each separate and different VOIP speaker stream to produce a corresponding separate and different speaker text channel for each given VOIP speaker stream that includes the one or more VOIP text strings spoken by the respective separate and different one of the two or more VOIP human speakers that corresponds to the given VOIP speaker stream;
    comparing each of the separate and different speaker text channels in real time to one or more predefined keywords to identify a predefined keyword present within a current text string of one of the separate and different speaker text channels spoken by a first one of the two or more separate and different VOIP human speakers;
    determining a predicted sequential correlation between the current text string containing the predefined keyword that is spoken by the first one of the two or more separate and different VOIP human speakers and one or more other text strings previously spoken by any of the two or more separate and different VOIP human speakers;
    determining a current context of a human user of the first information handling system, the human user of the first information handling system being a separate and different human user from the two or more separate and different VOIP human speakers; and
    selecting a predefined modality corresponding to the current context of the human user of the first information handling system, and taking an action corresponding to the determined modality to alert the human user of the first information handling system to the occurrence of the predicted sequential correlation between the current text string spoken by the first one of the two or more separate and different VOIP human speakers and the one or more other text strings previously spoken by any of the two or more separate and different VOIP human speakers;
    where each of the respective different users of the two or more separate and different information handling systems are participating as one of the respective two or more VOIP human speakers with a human user of the first information handling system in a current VOIP discussion session held across the network between the first information handling system and the two or more separate and different information handling systems; and
    where the respective incoming VOIP speech data of each given one of the two or more separate and different VOIP human speakers includes one or more VOIP text strings spoken during the current VOIP discussion session by the given VOIP human speaker, each of the two or more separate and different information handling systems providing the VOIP speech data of its corresponding human user to the current VOIP discussion session.

2. The method of claim 1, further comprising maintaining a sliding window buffer containing a buffer portion of the previously spoken separate and different speaker text channels; and determining the predicted sequential correlation between the current text string containing the predefined keyword and the one or more other text strings previously spoken by any of the two or more separate and different VOIP human speakers by sequentially correlating the buffer portion of previously spoken separate and different speaker text channels to the current text string containing the predefined keyword.

3. The method of claim 2, where the step of sequentially correlating the buffer portion of previously spoken separate and different speaker text channels to the current text string containing the predefined keyword comprises using semantic analysis to sequentially correlate the other one or more previously spoken text strings to the current text string containing the predefined keyword.

4. The method of claim 3, where the step of using semantic analysis to sequentially correlate the other one or more previously spoken text strings to the current text string containing the predefined keyword comprises:
    assigning a time stamp, semantic coefficient and speaker label to each of the other one or more previously spoken text strings;
    determining a weight for each of the previously spoken text strings using a combination of time stamp, semantic coefficient and speaker label assigned to each of the other one or more previously spoken text strings; and
    sequentially correlating the other one or more previously spoken text strings to the current text string containing the predefined keyword based on the determined weight of each of the previously spoken text strings.

5. The method of claim 2, where the step of sequentially correlating the buffer portion of previously spoken separate speaker text channels to the current text string containing the predefined keyword comprises comparing each of the previously spoken separate speaker text channels in the buffer to one or more pre-defined main words tuples to identify at least one text string in the buffer portion of previously spoken separate speaker text channels that corresponds to one of the pre-defined main words tuples, and determining a predicted sequential correlation between the at least one text string containing the pre-defined main words tuples and the current text string containing the predefined keyword.

6. The method of claim 1, where the determining the current context of the human user of the first information handling system comprises determining an identity of an active user application that is currently in focus on the user desktop of the first information handling system and that is different from a current VOIP application hosting the current VOIP discussion session on the first information handling system; and where the taking the action corresponding to the determined modality comprises one of:
- automatically displaying an alert to the user superimposed or over the displayed window of the determined current in-focus active application on a display device of the first information handling system only upon determining the identity of the active user application that is currently in focus on the user desktop of the first information handling system and that is different from a current VOIP application hosting the current VOIP discussion session on the first information handling system; or
- automatically changing the current in-focus application on the first information handling system to the current VOIP application from the determined current in-focus active application only upon determining the identity of the active user application that is currently in focus on the user desktop of the first information handling system and that is different from a current VOIP application hosting the current VOIP discussion session on the first information handling system.

7. The method of claim 1, where the determining current context of the human user of the first information handling system comprises determining that a monitored current activity of the human user is currently occurring on a device that is different than the first information handling system; and where the taking the action corresponding to the determined modality comprises automatically providing a visual and/or audio alert to the user on the other device that is different from the first information handling system only upon the determining that the current context of the human user of the first information handling system comprises a monitored current activity of the human user of the first information handling system that is currently occurring on the other device that is different than the first information handling system.

8. The method of claim 1, further comprising receiving and storing the predefined keyword corresponding to a current text string spoken by a first one of the separate and different VOIP human speakers prior to providing in the first information handling system the VOIP audio output stream including incoming VOIP speech data of the two or more separate and different VOIP human speakers received from across the network.

9. The method of claim 1, further comprising receiving and storing the predefined modality corresponding to the current context of the human user of the first information handling system from the human user of the first information handling system prior to providing in the first information handling system the VOIP audio output stream including incoming VOIP speech data of two or more separate and different VOIP human speakers received from across the network.

10. The method of claim 9, further comprising receiving and storing the predefined modality corresponding to the current context of the human user of the first information handling system prior to providing in the first information handling system the VOIP audio output stream including incoming VOIP speech data of the two or more separate and different VOIP human speakers received from across the network.

11. A system, comprising a first information handling system coupled to a network and comprising at least one programmable integrated circuit receiving a voice over internet protocol (VOIP) audio output stream including incoming VOIP speech data of two or more separate and different VOIP human speakers received from across the network, the two or more separate and different VOIP human speakers being respective different human users of two or more separate and different information handling systems that are different from the first information handling system and that are coupled across the network to the first information handling system; where the at least one programmable integrated circuit is programmed to:
- separate the VOIP audio output stream into two or more separate and different VOIP speaker streams that each correspond to a respective separate and different one of the two or more VOIP human speakers, and transcribe each separate and different VOIP speaker stream to produce a corresponding separate speaker and different text channel that includes the one or more VOIP text strings spoken by the respective separate and different one of the two or more VOIP human speakers that corresponds to the given VOIP speaker stream;
- compare each of the separate and different speaker text channels in real time to one or more predefined keywords to identify a predefined keyword present within a current text string of one of the separate and different speaker text channels spoken by a first one of the two or more separate and different VOIP human speakers;
- determine a predicted sequential correlation between the current text string containing the predefined keyword that is spoken by the first one of the two or more separate and different VOIP human speakers and one or more other text strings previously spoken by any of the two or more separate and different VOIP human speakers;
- determine a current context of a human user of the first information handling system, the human user of the first information handling system being a separate and different human user from the two or more separate and different VOIP human speakers;
- select a predefined modality corresponding to the current context of the human user of the first information handling system; and
- take an action corresponding to the determined modality to alert the human user of the first information handling system to the occurrence of the predicted sequential correlation between the current text string spoken by the first one of the two or more separate and different VOIP human speakers and the one or more other text strings previously spoken by any of the two or more separate and different VOIP human speakers;
- where each of the respective different users of the two or more separate and different information handling systems are participating as one of the respective two or more VOIP human speakers with a human user of the first information handling system in a current VOIP discussion session held across the network between the first information handling system and the two or more separate and different information handling systems; and where the respective incoming VOIP speech data of each given one of the two or more separate and different VOIP human speakers includes one or more VOIP text strings spoken during the current VOIP discussion session by the given VOIP human speaker, each of the two or more separate and different information handling systems providing the VOIP speech data of its corresponding human user to the current VOIP discussion session.

12. The system of claim 11, where the at least one programmable integrated circuit is further programmed to:
maintain a sliding window buffer containing a buffer portion of the previously spoken separate and different speaker text channels; and
determine the predicted sequential correlation between the current text string containing the predefined keyword and the one or more other text strings previously spoken by any of the two or more separate and different VOIP human speakers by sequentially correlating the buffer portion of previously spoken separate and different speaker text channels to the current text string containing the predefined keyword.

13. The system of claim 12, where the at least one programmable integrated circuit is further programmed to sequentially correlate the buffer portion of previously spoken separate and different speaker text channels to the current text string containing the predefined keyword using semantic analysis to sequentially correlate the other one or more previously spoken text strings to the current text string containing the predefined keyword.

14. The system of claim 13, where the at least one programmable integrated circuit is further programmed to use semantic analysis to sequentially correlate the other one or more previously spoken text strings to the current text string containing the predefined keyword by:
assigning a time stamp, semantic coefficient and speaker label to each of the other one or more previously spoken text strings;
determining a weight for each of the previously spoken text strings using a combination of time stamp, semantic coefficient and speaker label assigned to each of the other one or more previously spoken text strings; and
sequentially correlating the other one or more previously spoken text strings to the current text string containing the predefined keyword based on the determined weight of each of the previously spoken text strings.

15. The system of claim 12, where the at least one programmable integrated circuit is further programmed to sequentially correlate the buffer portion of previously spoken separate speaker text channels to the current text string containing the predefined keyword by:
comparing each of the previously spoken separate speaker text channels in the buffer to one or more pre-defined main words tuples to identify at least one text string in the buffer portion of previously spoken separate speaker text channels that corresponds to one of the pre-defined main words tuples; and
determining a sequential correlation between the at least one text string containing the pre-defined main words tuples and he current text string containing the pre-defined keyword.

16. The system of claim 15, further comprising a second information handling system comprising a programmable integrated circuit and being coupled to the first information handling system across the network, the programmable integrated circuit of the second information handling system being programmed to:
receive and store in a backend database of the second information handling system the pre-defined main words tuples received across the network from the human user of the first information handling system; and
then provide from the backend database the pre-defined main words tuples across the network to the first information handling system.

17. The system of claim 11, where the at least one programmable integrated circuit is programmed to:
determine the current context of the human user of the first information handling system by determining an identity of an active user application that is currently in focus on the user desktop of the first information handling system and that is different from a current VOIP application hosting the current VOIP discussion session on the first information handling system; and
where the action taken corresponding to the determined modality comprises one of:
automatically displaying an alert to the user superimposed or over the displayed window of the determined current in-focus active application on a display device of the first information handling system only upon determining the identity of the active user application that is currently in focus on the user desktop of the first information handling system and that is different from a current VOIP application hosting the current VOIP discussion session on the first information handling system, or
automatically changing the current in-focus application on the first information handling system to the current VOIP application from the determined current in-focus active application only upon the determining the identity of the active user application that is currently in focus on the user desktop of the first information handling system and that is different from a current VOIP application hosting the current VOIP discussion session on the first information handling system.

18. The system of claim 11, where the at least one programmable integrated circuit is programmed to:
determine the current context of the human user of the first information handling system by determining that a monitored current activity of the human user is currently occurring on a device that is different than the first information handling system; and
where the action taken corresponding to the determined modality comprises automatically providing a visual and/or audio alert to the user on the other device that is different from the first information handling system only upon the determining that the current context of the human user of the first information handling system comprises a monitored current activity of the human user of the first information handling system that is currently occurring on the other device that is different than the first information handling system.

19. The system of claim 11, further comprising a second information handling system comprising a programmable integrated circuit and being coupled to the first information handling system across the network, the programmable integrated circuit of the second information handling system being programmed to:
- receive and store in a backend database of the second information handling system the predefined keyword corresponding to a current text string spoken by a first one of the two or more separate and different VOIP human speakers across the network from the human user of the first information handling system; and
- then provide from the backend database the predefined keyword corresponding to the current text string spoken by the first one of the two or more separate and different VOIP human speakers across the network to the first information handling system.

20. The system of claim 11, further comprising a second information handling system comprising a programmable integrated circuit and being coupled to the first information handling system across the network, the programmable integrated circuit of the second information handling system being programmed to:
- receive and store in a backend database of the second information handling system the predefined modality corresponding to the current context of the human user of the first information handling system from the human user of the first information handling system; and
- then provide from the backend database of the second information handling system the predefined modality corresponding to the current context of the human user of the first information handling system across the network to the first information handling system.

* * * * *